United States Patent [19]

Rudi et al.

[11] Patent Number: 5,236,146
[45] Date of Patent: Aug. 17, 1993

[54] CAPSTAN BELT DRIVE

[75] Inventors: Guttorm Rudi, Fjellhamar; Nils M. Teien, Oslo; Bjorn Auke, Dalbo; Jan-Erik Dilling, Oslo, all of Norway

[73] Assignee: Tandberg Data A/S, Norway

[21] Appl. No.: 868,651

[22] Filed: Apr. 15, 1992

[51] Int. Cl.5 .......................... G03B 1/20; G11B 15/26
[52] U.S. Cl. ..................................... 242/209; 242/200; 242/201; 242/210
[58] Field of Search ............... 242/209, 210, 200, 201; 226/168, 181, 182

[56] References Cited

U.S. PATENT DOCUMENTS

| | | | |
|---|---|---|---|
| 3,688,960 | 9/1972 | Bunting | 242/209 |
| 3,813,690 | 5/1974 | Oka | 242/201 |
| 3,851,841 | 12/1974 | Bastiaans | 242/210 |
| 4,089,487 | 5/1978 | Ichikawa et al. | 242/201 |
| 4,171,111 | 10/1979 | Herleth | 242/201 |
| 4,185,795 | 1/1980 | Walraven | 242/209 |
| 4,711,410 | 12/1987 | Gwon | 242/201 |
| 4,982,911 | 1/1991 | Newell | 242/192 |

OTHER PUBLICATIONS

In re Newell, 13 USPQ 2d 1248-1250.

*Primary Examiner*—William A. Cuchlinski, Jr.
*Assistant Examiner*—C. W. Fulton
*Attorney, Agent, or Firm*—Hill, Steadman & Simpson

[57] ABSTRACT

A drive unit for driving magnetic tape held within a tape cartridge, the tape cartridge engaged to the drive unit in abutting fashion. The drive unit provides an elastomeric drive belt which surrounds a drive pulley, a tensioning pulley and an engagement pulley, the engagement pulley resiliently urging the drive belt against a cartridge roller located within the cartridge which progresses the magnetic tape within the cartridge. The drive pulley is driven directly by motor which progresses the belt around the three rotating pulleys. The arrangement eliminates the need for a separate friction roller arranged above the drive belt by using the drive belt itself to drive the cartridge roller.

16 Claims, 1 Drawing Sheet

CAPSTAN BELT DRIVE

BACKGROUND OF THE INVENTION

The present invention relates to a drive mechanism for transporting magnetic tape past a read/write head, such as is wound inside a computer tape cartridge.

Drive units or streamers, as a component of a magnetic tape read/write unit, are used to transport magnetic tape in a number of applications, such as in the case of tape cartridges for personal computers. In systems such as personal computers, the size limitations for components make it desirable to produce the smallest drive unit possible. In known drive units, an electric motor drives a drive pulley which turns an engagement pulley via a elastomeric drive belt. The engagement pulley has stacked axially thereabove a friction roller, co-rotated with the pulley, comprising a rubber-like resilient material. The rubber friction roller opposes and abuts a cartridge "puck" or cartridge roller arranged in the tape cartridge. The cartridge roller is entrained by a cartridge belt which winds around two belt rollers located at the back corners of the cartridge. The cartridge belt partially wraps around the tape wrapped circumference of two tape holding spools arranged in the cartridge. Therefore, when the motor drives the drive pulley, the drive belt turns the engagement pulley which turns the rubber friction roller which, in turn, causes the cartridge puck to rotate which transports the cartridge belt, which rotates the wrapped spools which cause the magnetic tape to laterally move past the read/write head.

SUMMARY OF THE INVENTION

The present invention provides an effective arrangement to reduce the thickness or the vertical clearance of the drive unit for a magnetic tape cartridge by eliminating the rubber friction roller as described above and instead locating the engagement pulley to front the cartridge roller of the cartridge. The belt itself therefore fronts and abuts the cartridge roller. The invention eliminates the need for a "stacked" arrangement of the engagement pulley and a friction roller, in part by eliminating the need for a friction roller. This reduces the required clearance of the drive unit measured in a direction axially of the cartridge roller.

The invention provides a compact arrangement for a drive unit wherein an electric motor is arranged with a drive shaft proceeding from the motor in a direction parallel to the axis of rotation of the engagement pulley in axial or direct drive alignment with the drive pulley. An elastomeric belt wraps around the engagement pulley and the drive pulley and is located between a cartridge roller or cartridge puck and the engagement pulley.

The engagement pulley has an inner cylinder coaxially arranged within an outer cylinder with ball bearings located between the two cylinders for smooth rotating operation. The inner cylinder holds a shaft or pin rotatingly therein, the pin for mounting the engagement pulley to the drive unit.

The invention is particularly suited for "streamers" where the tape is run continuously at the same velocity and the same data transport rate. However, the invention is not limited to that application.

DETAILED DESCRIPTION OF THE PREFERRED EMBODIMENTS

Figure 1:
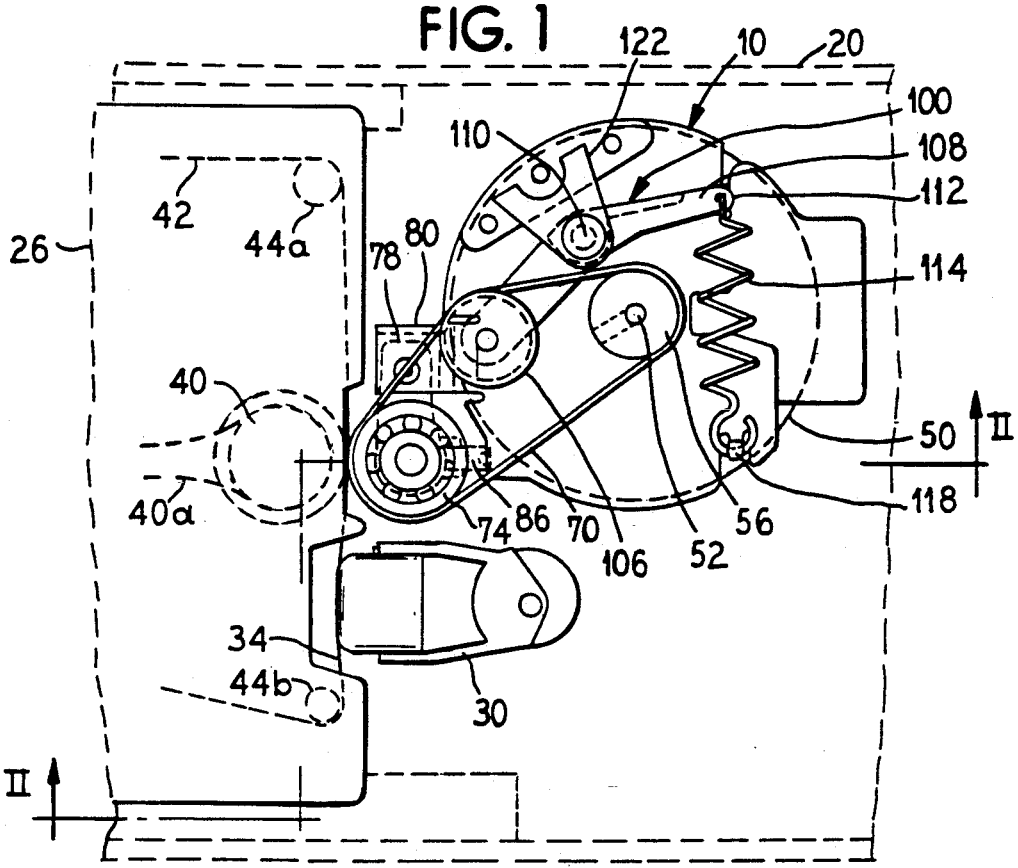
FIG. 1 is a plan view of the drive unit of the present invention engaged to a tape cartridge.

FIG. 1 shows a drive unit generally at 10 mounted within a housing shown dashed at 20. A cartridge 26 is shown inserted into the housing 20 and engaged both to the drive unit 10 and to a read/write head 30. The read/write head 30 is used to retrieve information or imprint information onto a magnetic tape 34 held within the cartridge 26. Within the cartridge 26 is a cartridge roller or a cartridge puck 40 which is rotatably held within the cartridge 26. A cartridge belt 40a wraps around the cartridge roller 40. A tape 42 is shown dashed and wound around a first guide roller 44a and a second guide roller 44b. Generally, two spools are also provided in the cartridge (not shown) which hold the bulk of the wound magnetic tape held by a cartridge 26. Progression of the tape winds one spool while unwinding the respective other spool. The cartridge belt 40a, as a continuous loop, partially wraps against inside facing surfaces of the wrapped spools so that when the cartridge belt 40a progresses, friction causes the spools to rotate. The cartridge belt 40a is also wrapped around two belt rollers arranged in the back corners of the cartridge (not shown).

The drive unit 10 comprises a drive motor 50 having a generally circular profile and having a drive shaft 52 proceeding axially from said profile. The drive shaft 52 mounts therearound a drive pulley 56. The drive pulley 56 is fixed for rotation with the drive shaft 52.

Mounted on top of the motor 50 is a cover plate 60. The drive shaft 52 proceeds through an opening in the cover plate 60 and the drive pulley 56 is arranged on top of the cover plate 60.

A belt 70 is shown wrapped around the drive pulley 56. The belt 70 also wraps around an engagement pulley 74 which is arranged fronting the cartridge roller 40 pinching the belt 70 between the cartridge roller 40 and the engagement pulley 74. The engagement pulley 74 is rotatably mounted on a swing arm 78 which is pivotally mounted to a trunnion piece 80 by a pin 82. The trunnion piece 80 is itself fixed to the cover plate 60. The swing arm 78 is further connected at a distal end 78a thereof to the cover plate 60 by a compression spring or leaf spring clip 86. The spring clip 86 thereby urges the swing ar 78 toward the cartridge roller 40 with a resilient force. Thus, the thus moving belt 70 is pressed onto the cartridge roller 40 causing the cartridge roller 40 to rotate, rotating the cartridge belt 40a, rotating the spools (not shown) causing the tape to laterally progress. The belt 70 comprises an elastomeric material which engages the cartridge roller 40 with sufficient friction to cause this progression.

A tensioning system shown generally at 100 will no be described. Arranged in an interior of the belt 70 is a tension pulley 106. The tension pulley 106 is rotatably carried on a lever arm 108 which is itself pivotably mounted to the cover plate 60 at a pivot pin 110. At an end 112 of the lever arm 108 is attached a coiled spring 114 which extends from the end 112 across the cover plate 60 and is anchored at an elevated point 118 on the cover plate 60. The tensile urging of the coiled spring 114 pivots the lever arm 108 about the pivot pin 110 to cause the tension pulley 106 to urge the belt 70 outwardly to retain the belt 70 in a taught condition. Also mounted at the pivot pin 110 is a bracket 122 rotatingly holding a top end of the pivot pin 110. The attachment points at elevated point 118, or pin 110, and the attachment points for the trunnion 80 and the spring clip 86 are all formed connections or holes on or through the cover plate 60 for ease of attachment of the various fixtures. The trunnion piece 80 can alternatively be formed integrally with the cover plate 60.

Figure 2:
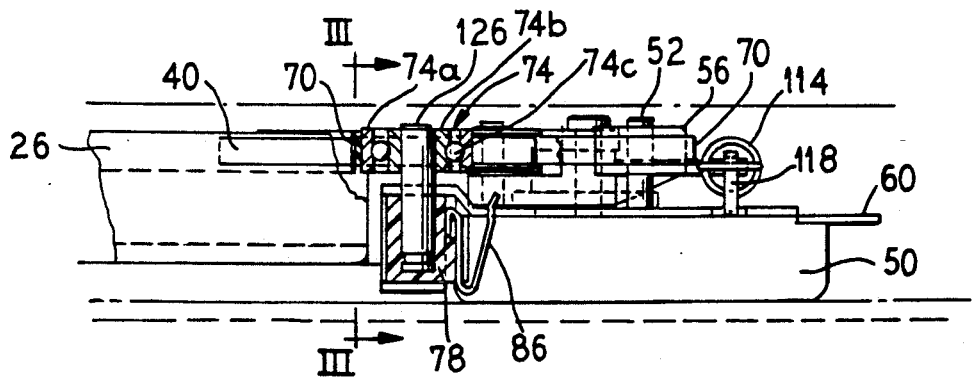
FIG. 2 is an offset sectional view of the drive unit and cartridge taken generally along II—II of FIG. 1.

FIG. 2 shows the engagement pulley 74 mounted to the swing arm 78 by a fixture pin 126. The engagement pulley 74 comprises an outer cylinder 74a and an inner cylinder 74b and a series of ball bearings 74c arranged between the inner cylinder and the outer cylinder.

Figure 3:
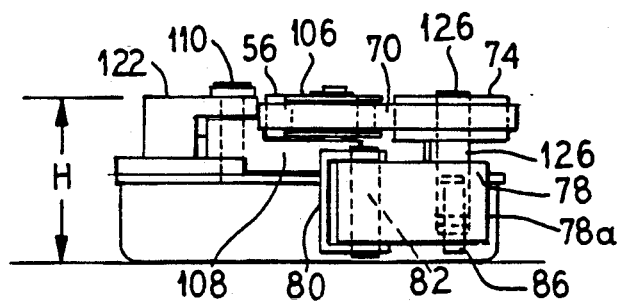
FIG. 3 is a sectional view taken generally along III—III of FIG. 2.

FIG. 3 shows the profile of the drive unit. The bracket 122 is shown which provides an upper journal to hold the pivot pin 110 which holds the lever arm 108 to the cover plate 60.

By eliminating the friction wheel of the prior art and utilizing the belt as a frictional capstan drive the overall height or profile H of the drive unit is reduced.

Although the present invention has been described with reference to a specific embodiment, those of skill in the art will recognize that changes may be made thereto without departing from the scope and spirit of the invention as set forth in the appended claims.

I claim as my invention:

1. A drive unit for transporting magnetic tape for use with a tape cartridge having reeled magnetic tape therein and a cartridge roller, at least partially externally accessible, for, when rotated, moving the tape from reel to reel, said drive unit comprising:
   means for receiving and holding a tape cartridge;
   an engagement pulley disposed to abut said cartridge roller when said tape cartridge is in said means for receiving, said engagement pulley mounted for rotation around a central axis;
   a drive pulley having a central axis parallel to said central axis of said engagement pulley;
   electric motor means in driving connection with said drive pulley for rotating said drive pulley about its central axis;
   an elastomeric drive belt wrapped around said drive pulley and said engagement pulley so that said engagement pulley is rotated when said drive pulley is rotated; and
   means for urging said engagement pulley to press said drive belt against said cartridge roller for rotating said cartridge roller.

2. The drive unit according to claim 1, wherein said drive unit further comprises a mounting base plate and a swing arm pivotably mounted to said mounting base plate, and wherein said engagement pulley is mounted at a first end of said swing arm and said means for urging comprises a first spring biasing a second, opposite end of said swing arm toward said cartridge roller.

3. The drive unit according to claim 2, wherein said engagement pulley comprises an inner cylinder and an outer cylinder with a plurality of ball bearings arranged therebetween.

4. The drive unit according to claim 3 further comprising a belt tensioning apparatus, mounted to said mounting base plate and resiliently urging said belt in a taut configuration around said drive pulley and said engagement pulley.

5. The drive unit according to claim 4, wherein said tensioning apparatus comprises:
   a tension pulley arranged in an inside area of said drive belt as wrapped around said drive pulley and said engagement pulley, resiliently urging said belt outwardly;
   a lever pivotally mounted to said mounting base plate, rotatably holding said tension pulley at a first end of said lever; and
   a second spring connected to a second end of said lever and attached at an opposite end of said second spring to said mounting base plate.

6. The drive unit according to claim 5, wherein said mounting base plate provides a trunnion and said swing arm is held by a pin to said trunnion and said first spring is a leaf spring.

7. The drive unit according to claim 1, wherein said drive unit further comprises a chassis holding said electric motor means and said means for urging in position with respect to said means for receiving and holding; and
   said drive unit further comprises a swing arm; and
   wherein said engagement pulley is rotatably mounted at a first end of said swing arm and said means for urging comprises a first spring biasing a second end of said swing arm away from said chassis.

8. The drive unit according to claim 7, wherein said chassis provides a trunnion and said swing arm is held by a pin to said trunnion and said first spring comprises a leaf spring.

9. The drive unit according to claim 1, wherein said engagement pulley comprises an inner cylinder and an outer cylinder with a plurality of ball bearings arranged therebetween.

10. The drive unit according to claim 1 further comprising a belt tensioning means, for resiliently urging said belt in a taught configuration around said drive pulley and said engagement pulley.

11. The drive unit according to claim 10, wherein said drive unit further comprises a chassis guiding said drive pulley against lateral movement with respect to said means for receiving and holding; and
   wherein said tensioning means comprises:
   a tension pulley arranged in an inside area of said drive belt as wrapped around said drive pulley and said engagement pulley, resiliently urging said belt outwardly;
   a lever pivotally mounted to said chassis, rotatably holding said tension pulley at a first end of said lever; and
   a spring connected to a second end of said lever and attached at an opposite end of said spring to said chassis.

12. In a drive unit for a read/write unit for reading or imprinting information from or on magnetic tape wound in a tape cartridge, the read/write unit having a read/write head fronting a portion of the magnetic tape through an open portion of said tape cartridge which is inserted into the read/write unit, the read/write unit having the drive unit installed therein, the drive unit having a chassis mounting an electric motor with a drive pulley arranged fixedly on an output shaft of the electric motor, the tape cartridge having mounted therein a cartridge roller exposed through said open portion of said cartridge, rotation of said cartridge roller progressing said tape past said read/write head, the tape cartridge mounted fronting the drive unit, the improvement comprising:
- an engagement pulley mounted to said chassis and fronting said cartridge roller;
- a drive belt wrapped around said drive pulley and said engagement pulley, a portion of said drive belt arranged between said engagement pulley and said cartridge roller; and
- said engagement pulley pressing said drive belt against said cartridge roller, said drive belt pinched between said cartridge roller and said engagement pulley.

13. The improvement of claim 12 further comprising means for urging said engagement pulley in resilient fashion to press said drive belt against said cartridge roller.

14. The improvement of claim 13, wherein said chassis comprises a swing arm and said engagement pulley is mounted to said drive unit on said swing arm, and said means for urging comprises a spring pressing a distal end of said swing arm toward said cartridge roller.

15. The improvement of claim 14, wherein said swing arm is mounted to said chassis via a trunnion and said swing arm is held by a pin to said trunnion.

16. The improvement according to claim 15 further comprising a tensioning apparatus having a tension pulley arranged in an inside area of said drive belt as wrapped around said drive pulley and said engagement pulley, resiliently urging said belt outwardly;
- a lever pivotally mounted to said chassis, rotatably holding said tension pulley at a first end of said lever; and
- a second spring connected to a second end of said lever and attached at a opposite end of said spring to said chassis.

* * * * *